United States Patent
Maisch et al.

(10) Patent No.: US 6,205,964 B1
(45) Date of Patent: Mar. 27, 2001

(54) DAMPING DEVICE FOR MOVABLE MASSES, PREFERABLY FOR ELECTROMAGNETIC SYSTEMS

(75) Inventors: Dieter Maisch, Riederich; Dieter Tischer, Wendlingen; Alfred Trzmiel, Gratenbery, all of (DE)

(73) Assignee: Hydraulik-Ring GmbH (DE)

( * ) Notice: Subject to any disclaimer, the term of this patent is extended or adjusted under 35 U.S.C. 154(b) by 0 days.

(21) Appl. No.: 09/364,399

(22) Filed: Jul. 30, 1999

(30) Foreign Application Priority Data

Jul. 31, 1998 (DE) .............................................. 198 34 522

(51) Int. Cl.[7] ...................................................... F01L 9/04
(52) U.S. Cl. .......................................................... 123/90.11
(58) Field of Search ............................. 123/90.11, 90.35, 123/90.55, 90.12; 251/129.1

(56) References Cited

U.S. PATENT DOCUMENTS 5,022,359 * 6/1991 Erickson et al. ................... 123/90.14
6,076,490 * 6/2000 Esch et al. .......................... 123/90.11
6,116,570 * 9/2000 Bulgatz et al. ..................... 251/129.1

* cited by examiner

Primary Examiner—Teresa Walberg
Assistant Examiner—Vinod D. Patel
(74) Attorney, Agent, or Firm—Robert W. Becker & Associates

(57) ABSTRACT

A damping device for an electromagnetic valve control of an internal combustion engine has a pressure chamber, a hydraulic supply line communicating with a first pressure chamber and supplying the pressure chamber with a hydraulic medium. A damping piston is positioned at one side of the pressure chamber and is moveable relative to the pressure chamber. A moveable mass acts on the damping piston. When the damping piston is moved in a first direction by the moveable mass from a rest position into the first pressure chamber, the hydraulic medium is initially displaced from the pressure chamber into the hydraulic supply line until the hydraulic supply line is closed off by the damping piston and a hydraulic pressure is generated in the pressure chamber to create a force acting counter to the movement of the moveable mass.

20 Claims, 11 Drawing Sheets

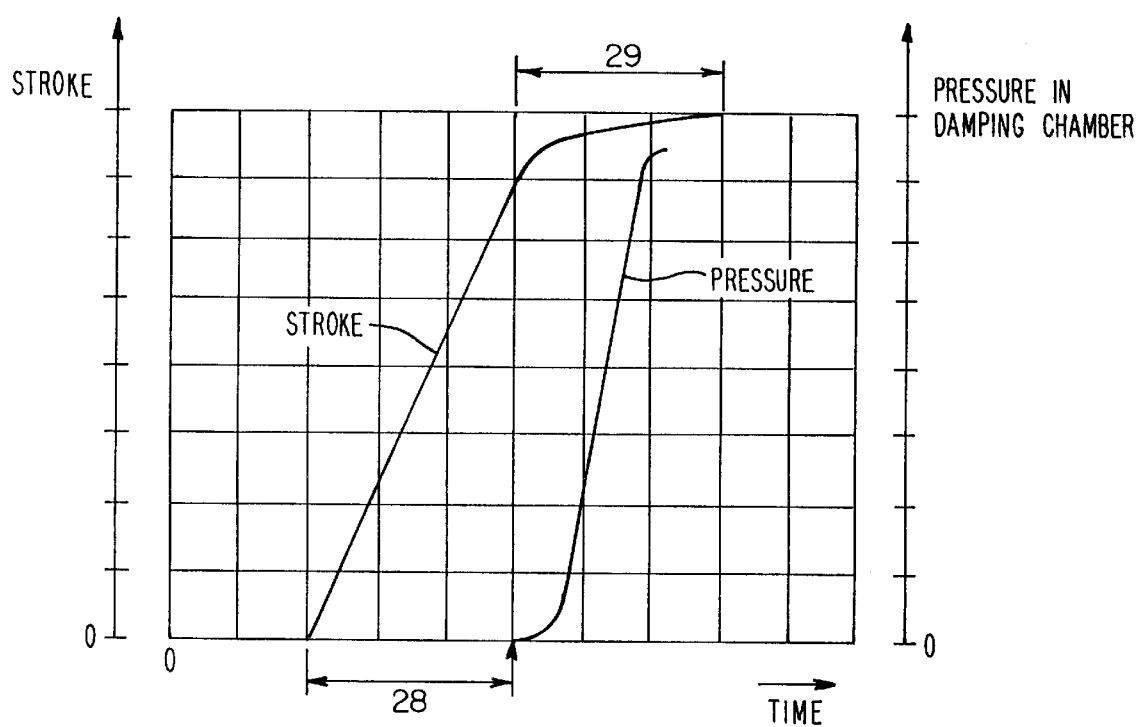

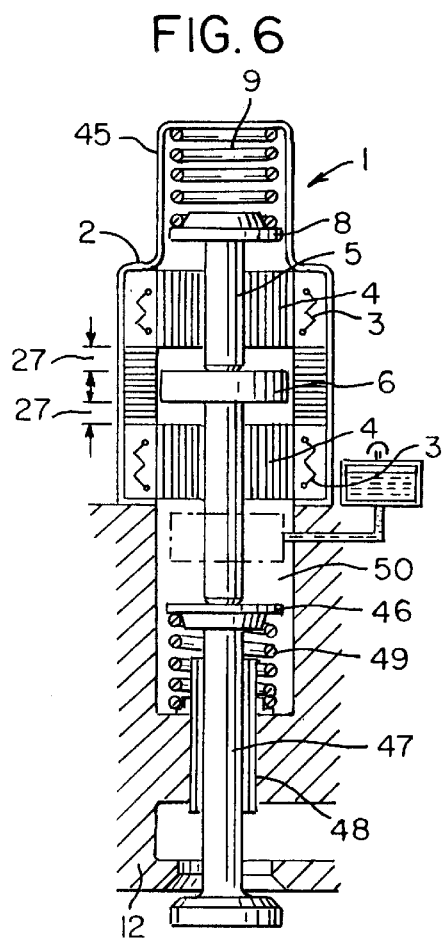
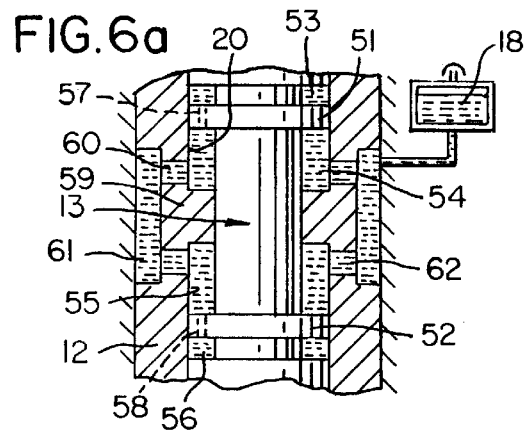
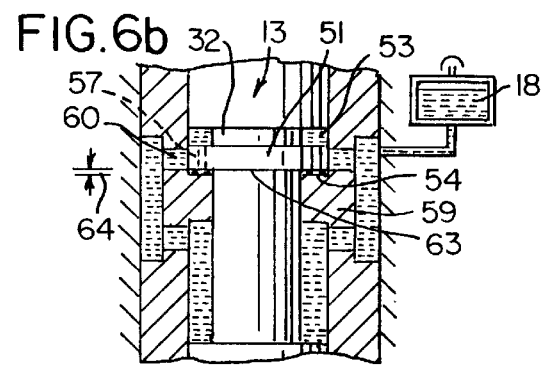
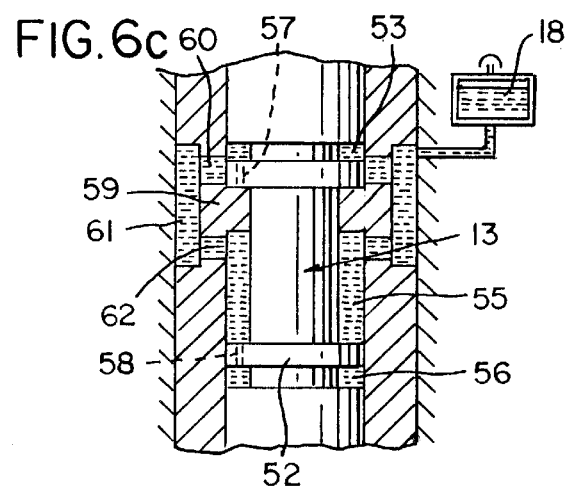

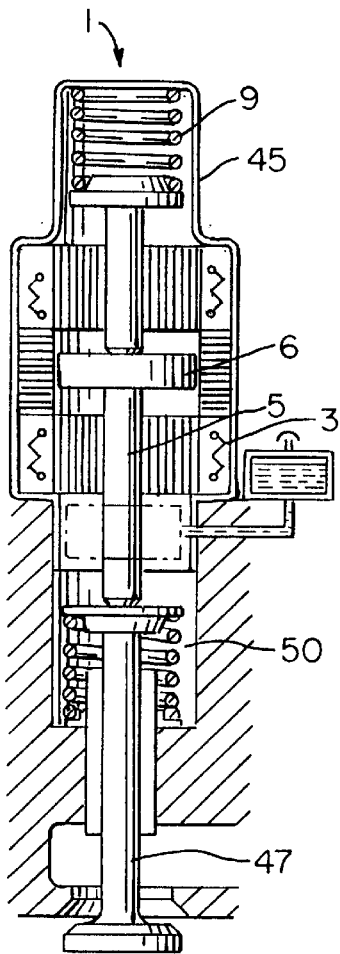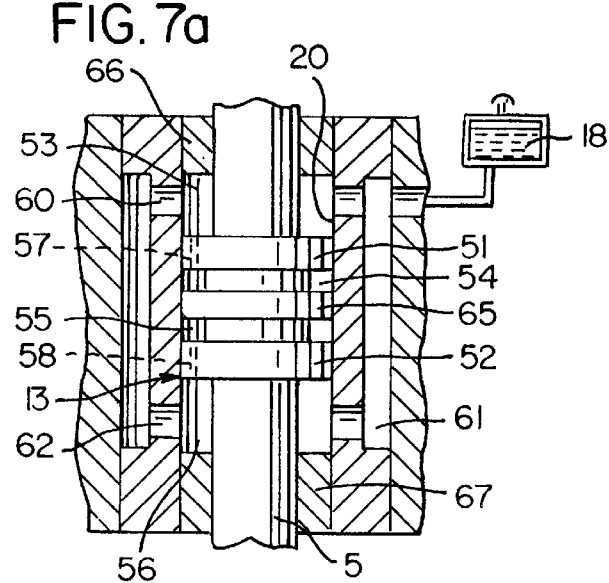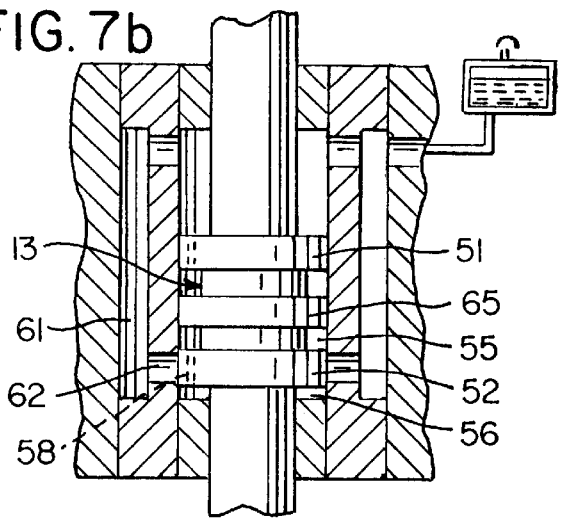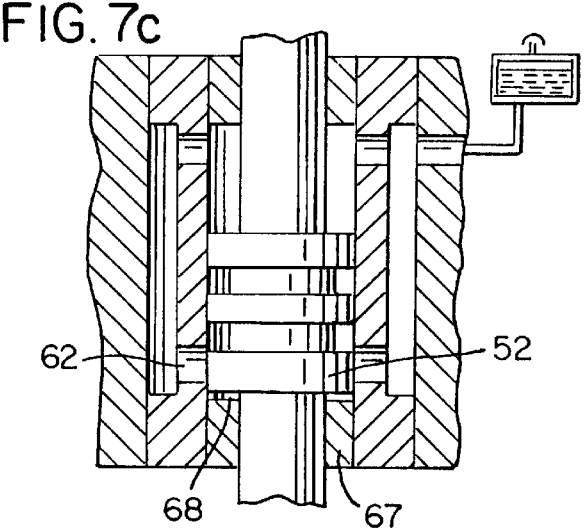

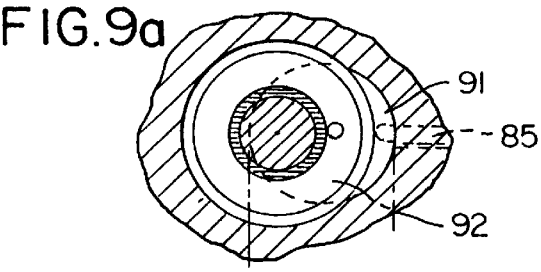
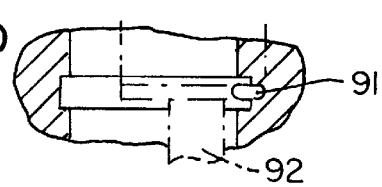
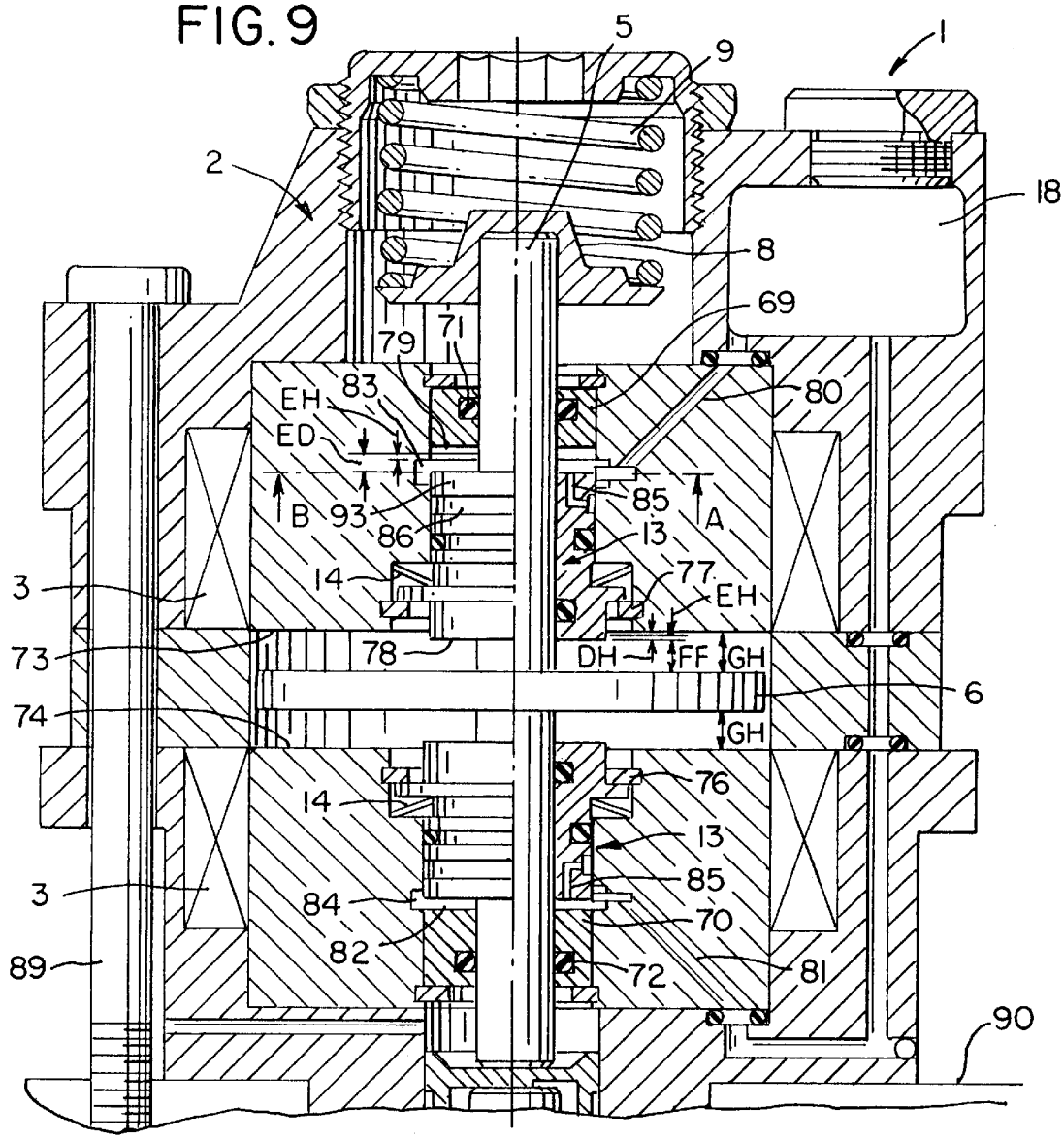

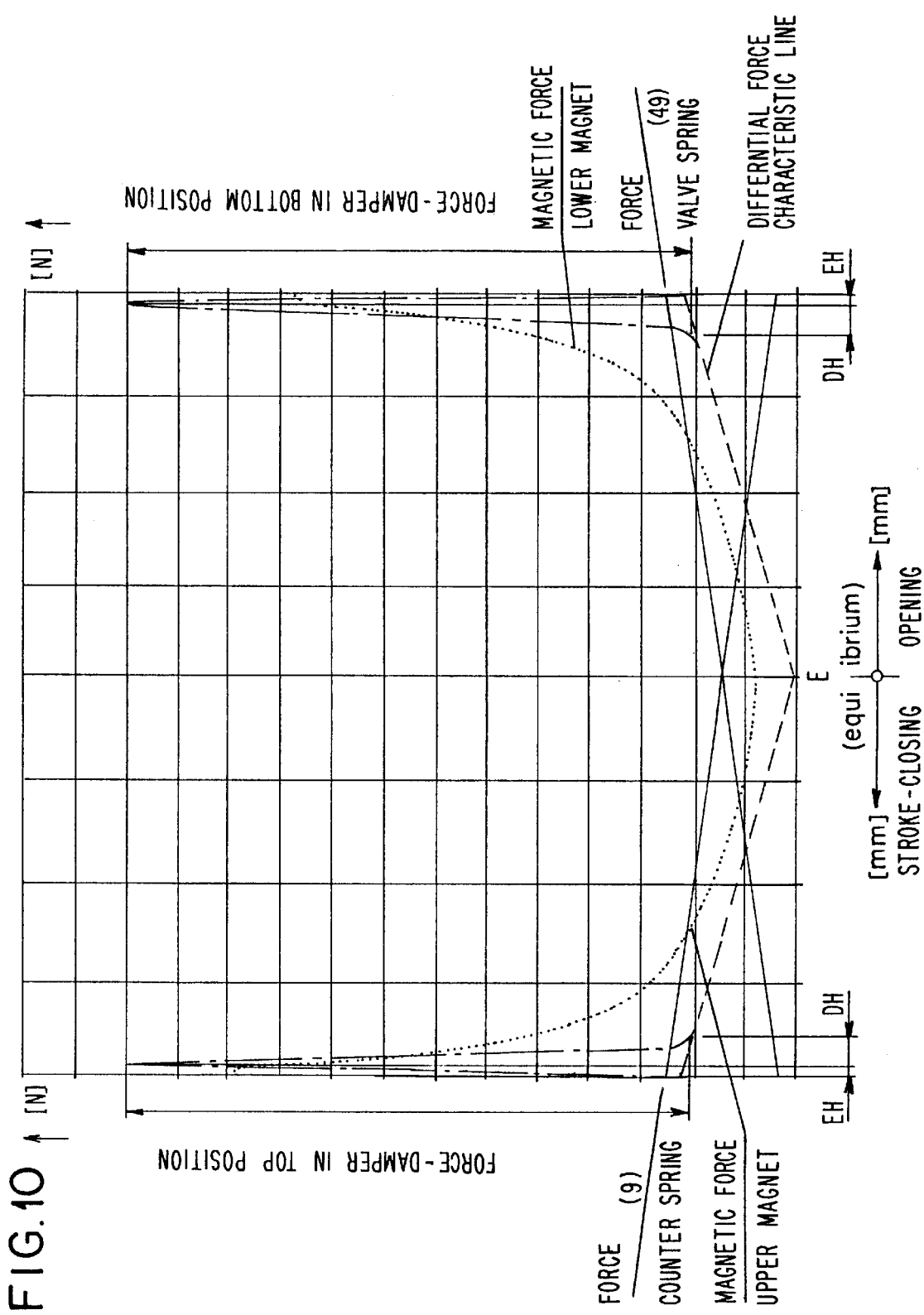

DAMPING DEVICE FOR MOVABLE MASSES, PREFERABLY FOR ELECTROMAGNETIC SYSTEMS

BACKGROUND OF THE INVENTION

The present invention relates to a damping device for movable masses, preferably for electromagnetic drive systems, especially for electromagnetic valve controls, operating without camshaft, of internal combustion engines, comprising at least one damping element that exerts a force which is oriented counter the direction of movement of the movable mass.

For electromagnetic valve controls, operating without camshaft, of internal combustion engines it is known to open the valve by the axlel of an armature. In the closing direction, the valve is spring-loaded. An armature is seated on the armature axle which can be moved in two directions by two coils. Starting from a central position, depending on the respective supply of electricity to a coil, the armature is then moved in the desired direction. The armature axle is secured by a spring force in abutment at the valve shaft. The pressure spring loading the armature axle is pretensioned such that in the current-free state of the electric drive the armature is maintained in the central position. Upon movement the armature will impact at high force and high velocity on the stops provided at the electric drive which results in a considerable noise pollution and also reduces the service life of the electric drive. The springs loading the armature axle or the valve stem present resistance to the armature axle and the armature. However, this resistance cannot be adjusted so high that the hard impact of the armature at the stops of the electric drive are dampened or reduced.

It is therefore an object of the present invention to embody a damping device of the aforementioned kind such that it operates at reduced noise level, has a long service life, and reliably and over a path as short as possible will reduce the movement to zero.

SUMMARY OF THE INVENTION

This object is inventively solved in that the damping element is provided in the form of a damping piston which delimits a pressure chamber into which at least one hydraulic supply line opens. Upon movement of the damping piston by the movable mass the hydraulic supply line is closed, while the hydraulic medium is displaced from the pressure chamber, so that within the pressure chamber a hydraulic pressure is generated.

In the inventive damping device the damping element is a damping piston which delimits a pressure chamber in which hydraulic medium is present. When the damping piston is moved by the moveable mass, the hydraulic medium is displaced from the pressure chamber until the flow cross-section of the hydraulic supply line is closed. Since upon movement of the damping piston the flow cross-section of the hydraulic supply line is reduced, with increasing stroke of the damping piston, the hydraulic pressure is increased in the pressure chamber so that in this manner the movable mass will encounter an increasing resistance. This provides for a high noise level damping as well as an increase of the service life of the damping device, respectively, of the drive system.

BRIEF DESCRIPTION OF THE DRAWINGS

The object and advantages of the present invention will appear more clearly from the following specification in conjunction with the accompanying drawings, in which:

FIG. 2 shows a stroke/time diagram of the damping device according to FIG. 1;

FIG. 6 shows an axial section of a further embodiment of the inventive damping device;

FIGS. 6a through 6c show different positions of the damping piston of the damping device of FIG. 6;

FIG. 7 shows a further embodiment of the inventive damping device;

FIGS. 7a through 7c show different positions of the damping piston of the damping device of FIG. 7;

FIG. 9 shows an enlarged representation of a portion of the damping device of FIG. 8;

FIG. 9a shows a section along the line A–B of FIG. 9;

FIG. 9b shows an axial section of a portion of the damping device of FIG. 9 with a milling device for producing a pocket in the damping device;

FIG. 10 shows a force/path diagram of the damping device according to FIG. 8;

DESCRIPTION OF PREFERRED EMBODIMENTS

The present invention will now be described in detail with the aid of several specific embodiments utilizing FIGS. 1 through 12.

The damping devices to be disclosed in the following are provided for use with movable masses, preferably in connection with electromagnetic drive systems. Such electromagnetic drive systems are preferably used for electromagnetic valve controls, operating without camshaft, of internal combustion engines.

Figure 1:
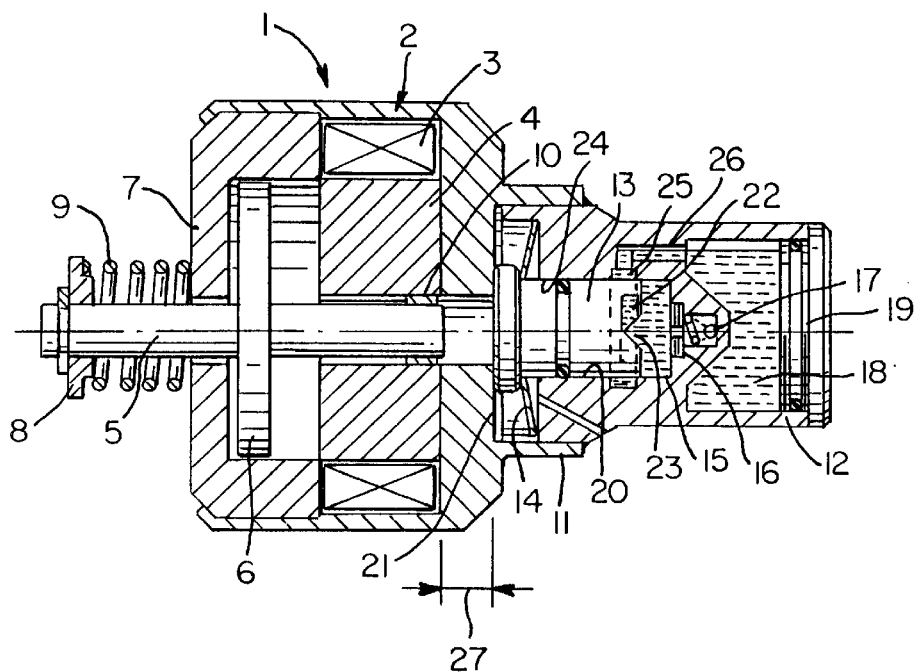
FIG. 1 shows an axial section of the inventive damping device.

The damping device according to FIG. 1 has an electric drive 1 with a housing 2 in which a coil 3 is positioned. It is surrounded by a core 4 through which the axle 5 extends on which the armature 6 is fastened. With respect to a compact design, the armature 6 is advantageously embodied as a flat armature (plate armature). However, it can also be embodied as a cylinder. The armature 6 is displaceable between the core and the bottom 7 of the housing 2 by the axle 5. The armature axle 5 projects through the bottom 7. On the end of the armature axle or rod 5 a spring plate 8 is fastened outside of the housing 2 at which a pressure spring 9 is supported. It surrounds external to the housing 2 at a spacing the armature axle 5 and is supported at the outer side of the housing bottom 7. The force of the pressure spring 9 forces the armature axle 5 toward a non-represented valve stem. Within the core 4, the armature axle 5 is axially guided by at least one bearing 10.

The housing 2 has at one end face a cylindrical flange 11 to which is connected a housing portion 12 in which a damping piston 13, aligned with the armature axle 5, is positioned. The damping piston 13 is loaded by at least one return spring 14 which is preferably a plate spring so that only a minimal mounting space, especially in the axial direction, is required. At the side of the damping piston 13 facing away from the armature axle 5 a pressure chamber 15 is provided into which a suction line 16 opens. In the suction lines 16 a check valve 17 is positioned which separates the pressure chamber 15 from the reservoir 18 for the hydraulic medium. The reservoir 18 is closed by a screw lid 19 that is screwed into the housing portion 12.

The damping piston 13 is guided in a sealing manner within the bore 20 (receiving chamber) of the housing portion 12.

When the coil 3 is not supplied with current, the components are in a position shown in FIG. 1. The armature axle 5 is pulled by the spring 9 into the stop position in which the armature 6 rests at the housing bottom 7. The damping piston 13 is forced by the return spring 14 into abutment at the contact surface 21. The armature axle 5 in this position is axially spaced from the damping piston 13. Upon return of the damping piston 13, by the force of the return spring 14, into the position represented in FIG. 1, a vacuum is produced in the pressure chamber 15 which opens the return valve (check valve) 17. Accordingly, a portion of the hydraulic medium present within the reservoir 18 is thus quickly sucked into the pressure chamber 15. The end face 22 of the damping piston 13 delimiting the pressure chamber 15 has a depression 28 which extends diametrically and has in cross-section a triangular shape. In the wall 24 of the bore (receiving chamber) 20, an annular channel 25 is provided which is in communication with a bore 26 connected to the reservoir 18 which bore is provided in the housing portion 12. Upon return of the damping piston 13 into the abutment position represented in FIG. 1, the depression 23 providing a control cross-section is moved into the area of the annular channel 25 so that via it and the bore 26 connected thereto hydraulic medium is returned to the reservoir 18. Due to the triangular cross-sectional embodiment of the depression 23, the opening-cross section upon return of the damping piston 13 into the abutment position constantly increases so that the pressure chamber 15 is filled via the annular channel 25 as well as the open check valve 17 quickly with hydraulic medium.

When the coil 3 is supplied with current, the armature 6 is moved against the force of the pressure spring 9. At the beginning of this displacement stroke, the armature axle 5 has a spacing 27 to the damping piston 13. Accordingly, for the initial movement of the armature 6 only a minimal force is required. The spacing 27 between the armature axle 5 and the damping piston 13 provides a free float spacing, and the armature axle 5, after overcoming this spacing, engages the damping piston 13 and now moves the damping piston 13 counter to the force of the return spring 14 as well as counter to the hydraulic pressure present within the pressure chamber 15. The generation of this hydraulic pressure in the pressure chamber 15 will be explained in the following with the aid of FIGS. 1a through 1c.

Figure 1A:
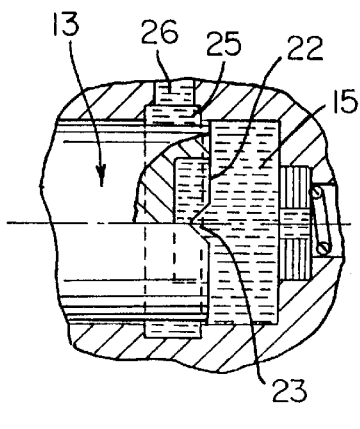
FIGS. 1a through 1c show different positions of the damping piston of the inventive damping device.
Figure 1B:
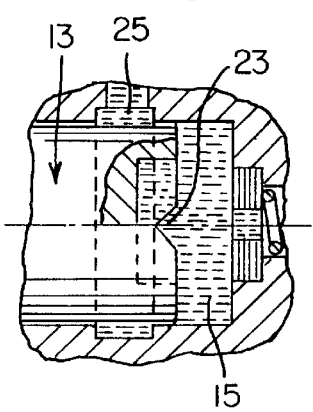
Figure 1C:
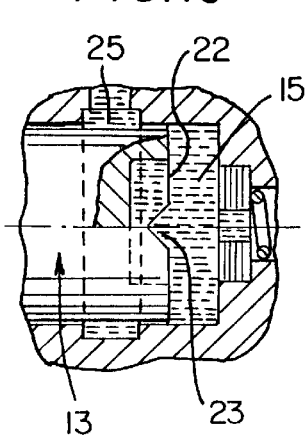

FIG. 1a shows the damping piston 13 in the position corresponding to FIG. 1 in which the coil 3 is not supplied with current. The depression 23 in the end face 22 of the damping piston 13 provides a connection to the annular channel 25 and to the bore 26. When the damping piston 13 is moved by the armature axle 5, counter to the force of the return spring 14, the outflow cross-section between the depression 23 and the annular channel 25 is continuously reduced because of the triangular cross-sectional embodiment of the depression 23. FIG. 1b shows the situation in which the flow cross-section has just been reduced to zero. In this position of the damping piston 13, it is impossible for the hydraulic medium to exit the pressure chamber 15 via the depression 23 of the damping piston 13 toward the annular chamber 25. The check valve 17 (FIG. 1) is closed because of the movement of the damping piston 13. As soon as the damping piston 13 has reached the position according to FIG. 1b and the outflow cross-section to the annular channel 25 is closed, the velocity of the damping piston 13 is reduced to zero. The braking action for the armature axle 5 begins at the point in time at which the armature axle 5 engages the damping piston 13. FIG. 1c shows the final position of the damping piston 13 in which there is no longer a connection between the annular channel 25 and the depression 23 in the end face 22 of the damping piston 13.

In the disclosed manner, the movement of the armature 6 is optimally dampened because the hydraulic medium within the pressure chamber 15 is displaced upon movement of the damping piston 13 through the constantly decreasing outflow cross-section of the depression 23 in the end face 22 into the annular channel 25. The hydraulic medium is then returned via bore 26 to the reservoir 18. As soon as the connection between the depression 23 at the end face 22 and the annular channel 25 is closed, the damping piston 13 can no longer be moved due to the hydraulic medium now enclosed in the closed pressure chamber 15.

FIG. 2 shows the corresponding stroke/time characteristic line of the device according to FIG. 1. The stroke of the armature 6 changes linearly as soon as the electric drive 1 is supplied with current. Since the armature axle 5 first has a spacing to the damping piston 13 (FIG. 1), the armature 6, respectively, the armature axle 5 is first moved with minimal force. The armature axle 5 passes through a free float phase 28 until it impinges on the damping piston 13. Now the armature axle 5 must move the damping piston 13 counter to the force of the return spring 14 and counter to the force of the hydraulic pressure. Accordingly, the velocity of the free floating passage of the armature axle 5 and of the armature 6 is thus greatly reduced, as shown by the curved stroke characteristic line, and is reduced within a very short period of time to zero. The braking action of the armature 6 is performed during the braking time period 29 (FIG. 2).

In this diagram the pressure characteristic line is also represented which results from the pressure built up in the pressure chamber 15 (FIG. 1). The pressure begins to increase as soon as the armature axle 5 engages the damping piston 13. Accordingly, the pressure begins to rise at the time when the braking time period 29 begins. The pressure increases within a very short period of time to its maximum value. It is reached shortly before movement of the damping piston 13 is completed. The pressure is maintained at the high maximum value which characterizes the corresponding hydraulic pressure in the pressure chamber 15 caused by the displacement of the damping piston 13 to the maximum extent by the armature axle 5 according to FIG. 1c.

When current is no longer supplied to the coil 3 after a certain securing or holding time, the damping piston 13 is suddenly returned under the force of the return spring 14 and of the hydraulic pressure present within the pressure chamber 15. The damping piston 13 entrains via the armature axle 5 the armature 6. The movement stroke of the armature axle 5 and of the armature 6 is supported by the pressure spring 9 that, as soon as the damping piston 13 contacts the contact surface 21 of the housing 1, moves the armature axle 5 into the initial position shown in FIG. 1 in which the armature axle 5 has free-float spacing 27 from the damping piston 13.

Figure 3:
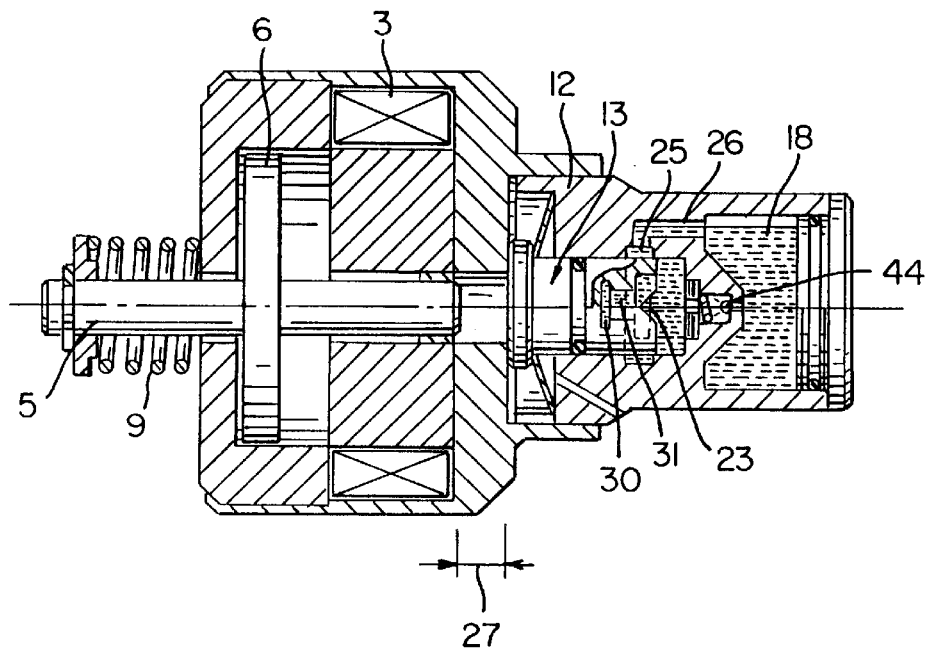
FIG. 3 shows an axial section of a further embodiment of the inventive damping device.

The embodiment according to FIG. 3 is substantially identical to the previous embodiment. The damping piston 13 has a control cross-section portion 30 extending radially and provided in addition to the diametric depression 23 in the end face 22. The control cross-section portion 30 has a rectangular cross-section. It is connected by axially extending bore 31 (FIG. 3a) to the pressure chamber 15. Between the damping piston 13 and the wall 24 of the bore or receiving chamber 20, in which the damping piston 13 is received, a throttle 32 in the form of an annular gap is provided. Via this throttle 32 the hydraulic medium contained in the pressure chamber 15 can be displaced upon movement of the damping piston 13 into the annular channel 25 and from there via the bore 26 into the reservoir 18 (FIG. 3). This will be explained in the following. The throttle, of course, can also be provided by any other suitable design, for example, by an additional throttle nozzle.

Figure 3A:
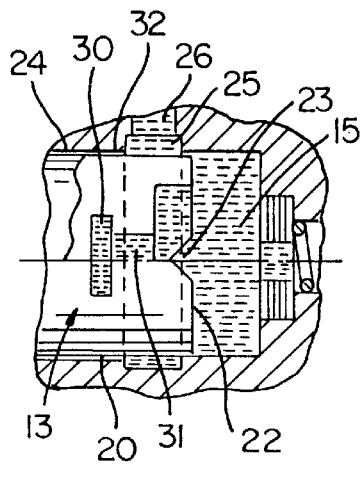
FIGS. 3a through 3c show different positions of the damping piston of the damping device according to FIG. 3.
Figure 3B:
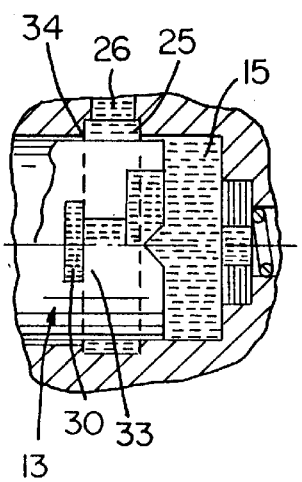

FIG. 3a shows the damping piston 13 in its initial position in which the coil 3 (FIG. 3) is not supplied with current. The armature axle 5 in this position is spaced from the piston 13. The depression 13 is in communication with the annular channel 25. When current is supplied to the coil 3, the armature axle 5 and thus the armature 6 are moved counter to the force of the pressure spring 9. After overcoming the free-float spacing 27 (FIG. 3) the armature axle 5 contacts the damping piston 13 and entrains it. The flow cross-section between the depression 23 and the annular channel 25 is closed increasingly with increasing movement stroke of the damping piston 13. In FIG. 3 the position of the damping piston 13 is shown in which this flow cross-section has just been closed. Due to the decreasing flow cross-section resulting from increasing displacement stroke, the desired damping action upon movement is realized. In the position according to FIG. 3b, the right control edge 33 is conguent to the left control edge 34 of the annular channel 25. Advantageously, the control cross-section portion 30 in this position is closed, i.e., is covered. However, the damping piston 13 can be further moved from this central position because the hydraulic medium present within the pressure chamber 15 can flow via the throttle 32 from the pressure chamber 15 into the annular channel 25 and from there via the bore 26 into the reservoir 18.

Figure 3C:
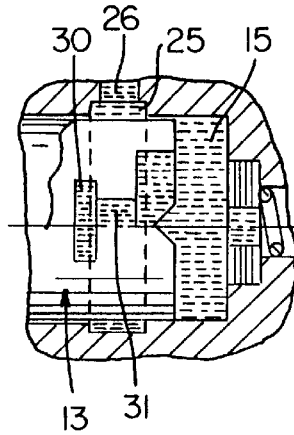
Figure 4:
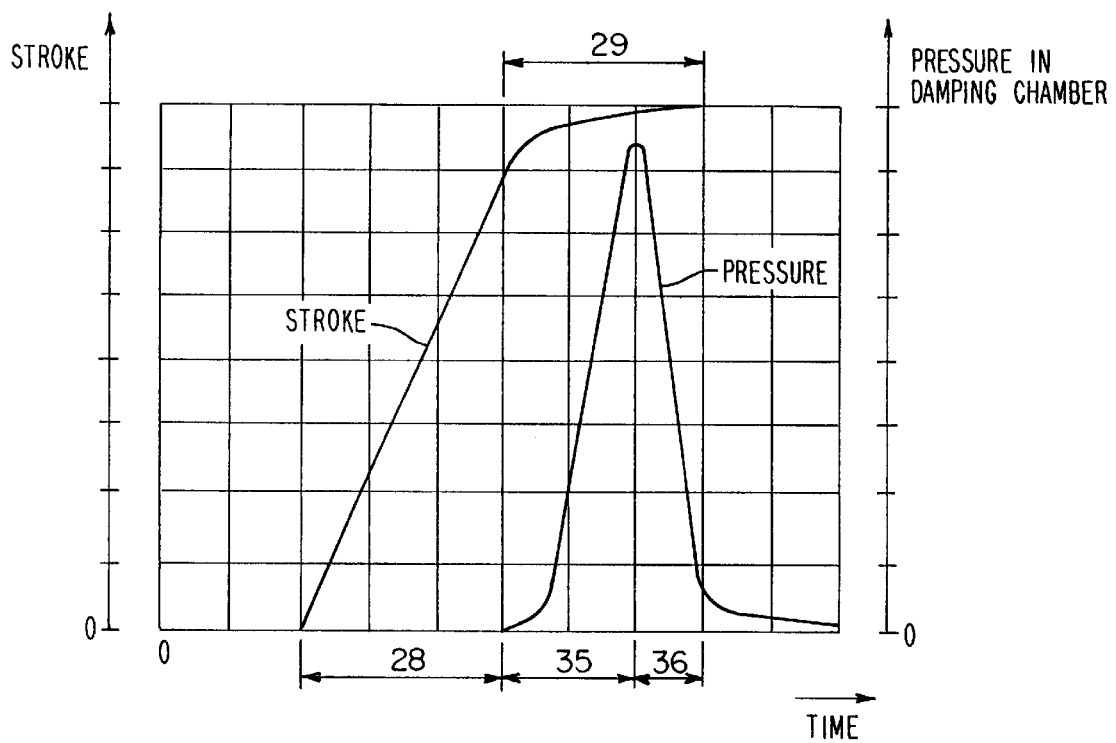
FIG. 4 shows a stroke/time diagram of the damping device of FIG. 3.

As soon as the damping piston 13 is further moved from the central position (represented in FIG. 3b) by the armature axle 5 into the position according to FIG. 3c, the control cross-section portion 30 covers partially the annular channel 25. This further movement of the damping piston 13 then displaces the hydraulic medium from the pressure chamber 15 via the axial bore 31 and the control cross-section portion 30 into the annular chamber 25. From here, the hydraulic medium will flow via the bore 26 back into the reservoir 18.

Due to the control cross-section 30 a different characteristic line behavior with respect to the hydraulic pressure in the pressure chamber 15 results. As soon as the armature axle 5 upon supplying the coil 3 with current is moved, the stroke of the armature 6 will initially increase linearly during the free-float phase 28. As soon as the armature axle 5 at the end of the free-float phase 28 contacts the damping piston 23, the free flow velocity of the armature 6 is greatly reduced, in correspondence to the curved stroke characteristic line and within shortest amount of time is reduced to zero. Accordingly, the pressure of the hydraulic medium within the pressure chamber 15 increases as soon as the damping piston 23 is moved by the armature axle 5. The pressure increase takes place quickly within a shortest amount of time to a maximum value. In contrast to the previous embodiment, the pressure of the hydraulic medium in the pressure chamber 15 is reduced very suddenly within a short amount of time as soon as the damping piston 23 has reached its end position. In this end position, as has been explained with the aid of FIG. 3c, the pressure chamber 15 is connected to the reservoir 18 via the axial bore 31, the control cross-section portion 30, the annular channel 25, and the bore 26. The hydraulic medium can thus flow in the end position of the damping piston into the reservoir 18. In this manner the electromagnetic securing force of the electric drive 1 encounters only a very small hydraulic counter force. Due to the relief via the bores 30, 31, for securing the armature 6 in its end position a substantially reduced magnetic force is required for the excited coil 3 in comparison to the example of FIG. 1. The characteristic line of the magnet itself can be unchanged. Until the maximum pressure of the hydraulic medium is reached in the time period 35, pressure is increased, while the pressure is decreased upon opening of the communication line between the pressure chamber 15 and the reservoir 18 via the bores 30, 31 within the time period 36.

Figure 5:
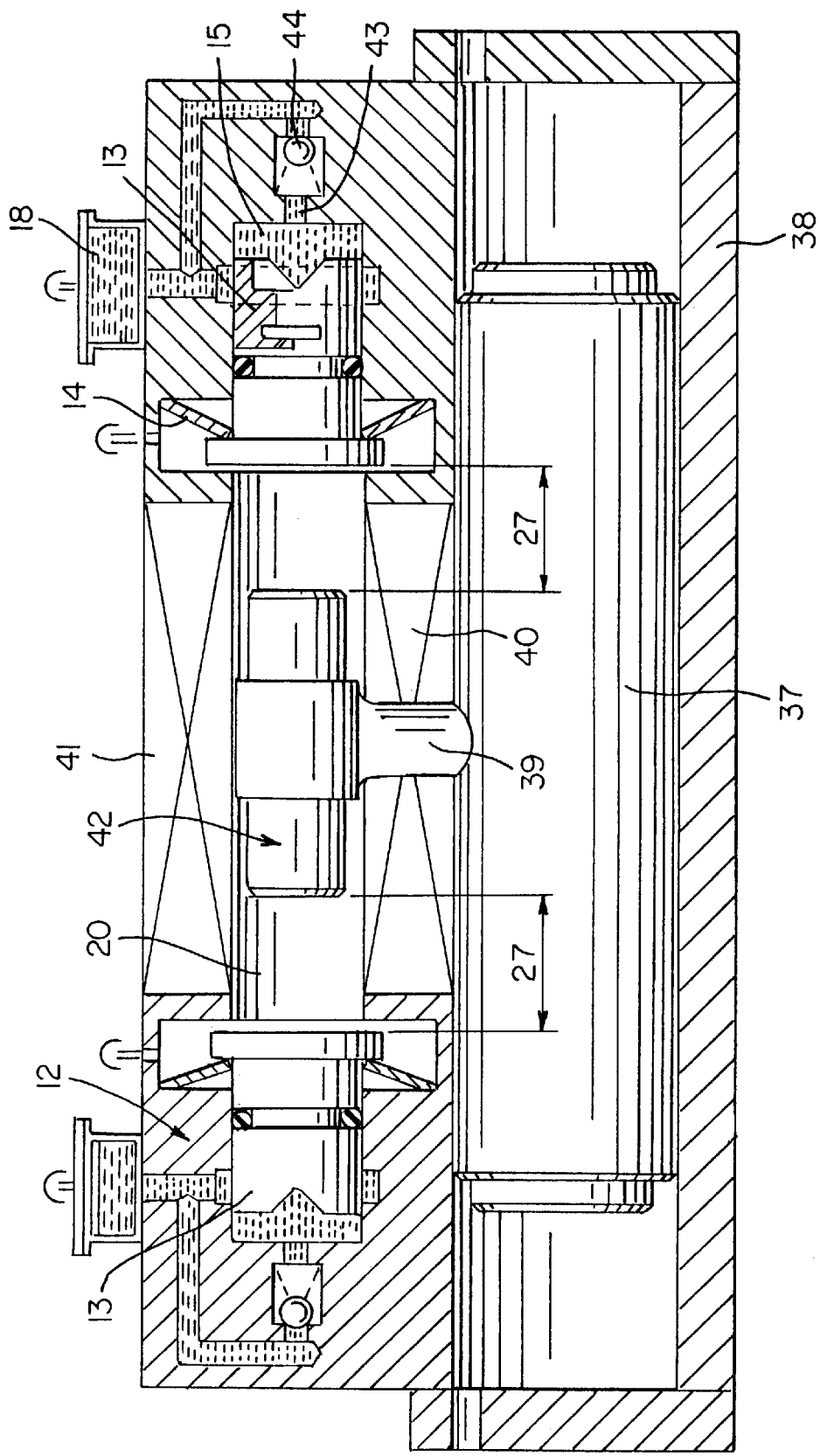
FIG. 5 shows an axial section of a further embodiment of the inventive damping device.

While in the previous embodiments the armature axle 5 has a free float spacing 27 only in one displacement direction, in the embodiment according to FIG. 5 too such free float spacings 27 are provided. A transmission element 42 is provided at the component 37 which may be an armature but also any other suitable component for example, a hydraulically, pneumatically, or mechanically driven element. It is moveably positioned in a housing portion 38. At half the length this drive element 37 is provided with a radially projecting stay 39 which projects through a longitudinal slot 40 into the wall of the housing portion 38 and is fastened to the transmission element 42. The longitudinal slot 40 has a length such that the actuating piston can be moved by the desired amount. At the side of the housing portion 12 opposite the longitudinal slot 40 a further longitudinal slot 41 is provided. Thus, a connection between the receiving chamber 20 in which the transmission element 42 is positioned and the surrounding space is provided.

At both sides of the transmission element 42 a damping piston 13 is provided. The left damping piston in FIG. 5 corresponds to the one disclosed in FIG. 1, and the right damping piston in FIG. 5 corresponds to the one disclosed in FIG. 3. The two damping pistons can also be of identical construction either according to FIG. 1 or FIG. 3. The corresponding damping devices are then embodied accordingly.

When the drive element 37 is moved to the right from the center position shown in FIG. 5, the transmission element 42, after overcoming the free float spacing 27, contacts the damping piston 13. It is then moved counter to the force of the return spring 14 and the pressure generated in the pressure chamber 15. The pressure generation and the pressure decrease upon movement of the right damping piston 13 of FIG. 5 takes place in the manner disclosed in connection with FIGS. 3 and 3a through 3c. A bore 43 is connected to the pressure chamber 15 in which a check valve 44 is positioned. Via this bore 43 the pressure chamber 15 is connected to the reservoir 18 which in contrast to the embodiment according to FIG. 3 is arranged external to the housing portion 12. The reservoir 18, of course, can also be integrated into the housing portion 12, as shown in the embodiment according to FIG. 3. In this case, the bore 43 is not necessary. The check valve 44 is seated, as shown in FIG. 3, for such an embodiment within the housing portion 12 between the pressure chamber 15 and the reservoir 18 external to the housing portion 12. The return valve 44 ensures, as in the previous embodiments, that during movement of the damping piston 13 by the armature axle 5 the pressure chamber 15 is closed relative to the reservoir 18.

Depending on the movement direction of the transmission element 42, after overcoming the respective free float spacing 27 the corresponding damping piston 13 is moved. During this free float movement only the air resistance in this space must be overcome because in the bore 20 only air is present. Instead of the longitudinal slot 41 the wall of the housing portion 12 may be provided with a groove. Upon movement of the transmission element 42 in the bore 20 the air is then transferred between the spaces on either side of the transmission element 42 via this groove. Otherwise, the damping device operates according to the previously disclosed embodiments.

FIG. 6 shows an especially compact design of the damping device. A flat or plate armature 6 is positioned on the armature axle 5 which is moveable between two cores 4 of the electric drive 1. The housing 2 of the electric drive 1 has an extension 45 in which the pressure spring 9 is provided which loads the armature axial 5. The pressure spring 9 is supported at the spring plate 8 seated on the armature axle 5 as well as at the bottom of the housing extension 45. The armature axle 5 rests at a spring plate 46 that is connected to the free end of the valve stem 47. It is guided in a bearing 48. The spring plate 46 and a pressure spring 49 loading the valve stem 47 are positioned in a receiving chamber 50 of the housing portion 12.

The armature 6, which is embodied according to the previous embodiments as a plate armature, has two free spacings 27 according to the embodiment of FIG. 5. In FIG. 6 the damping piston 13 is represent only schematically by a dash-dotted line. With the aid of FIGS. 6a through 6c, the embodiment of this damping device is disclosed in detail.

FIG. 6a shows the damping piston 13 in a central position which corresponds to the central position of the armature 6 of FIG. 6. The damping piston 13 has two stays 51, 52 with which it is sealed in the bore 20 of the housing portion 12. The two stays 51, 52 each separate two hydraulic chambers 53, 54 and 55, 56 from one another. Both stays 51, 52 are provided with at least one bore 57, 58 penetrating them by which the pressure chambers 53, 54, respectively, 55, 56 are connected to one another. The two neighboring pressure chambers 54, 55 are separated from one another by a radially inwardly projecting flange of the housing portion 12 at which the damping piston 13 rests sealingly.

The pressure chamber 54 is connected by a bore 60 to the annular channel 61 which is provided in housing portion 12. By at least one further bore 62 the hydraulic chamber 55 is connected to the annular channel 61.

In the position of FIG. 6, the damping piston 13 is in its central position in which the bore 60 is open. The hydraulic medium in the hydraulic chambers 54, 55, in the bores 60, 62, and in the annular channel 61 is thus not under pressure. When the electric drive 1 (FIG. 6) is actuated and one of its two coils 3 is excited, the damping piston 13 is moved by the armature axle 5, depending on the selected excited coil 3, into the corresponding direction. When the damping piston 13 is moved from the central position according to FIG. 6a in a direction toward the valve stem 47 the hydraulic medium in the hydraulic chamber 54 is pressurized by the stay 51 of the damping piston 13 because the hydraulic medium must be displaced via the bore 60 into the annular channel 61 and from there via the bore 62 into the hydraulic chamber 55. To the extent by which the volume of the hydraulic chamber 54 is reduced, the volume of the hydraulic chamber 55 is increased. The hydraulic medium in this manner is only moved, respectively, displaced between the two hydraulic chambers 54 and 55.

In the position according to FIG. 6b, one control edge 63 of the stay 51 of the damping piston 13 has closed the flow cross-section at the bore 60 by covering it so that the flow cross-section is zero. In this position the stay 51 has a minimal spacing 64 from the housing flange 59. Accordingly, the remaining volume of the hydraulic 54 containing hydraulic medium is pressurized. The hydraulic medium present within the hydraulic chamber 53 is pressurized by the same pressure via the bore 57 in the stay 51. In this position of the damping piston 13 the braking action is thus completed.

In order for the damping piston 13 to be able to be displaced from the position according to FIG. 6b farther into the position according to FIG. 6c, the throttle 32 is provided as an annular gap via which the hydraulic chamber 54 is connected to the bore 60. Via the throttle 32 the hydraulic medium can flow upon further movement of the damping piston 13 from the hydraulic chamber 54 into the bore 60. The damping piston 13 is moved until it has only a minimal spacing from the housing flange 59 (FIG. 6c). Upon further movement the bore 60 is opened so that the hydraulic medium can be displaced from the hydraulic chamber 54 via the bore 57, the hydraulic chamber 53, and the bore 60 into the annular channel 61. In this manner, pressure is relieved. The hydraulic medium can flow from the annular channel 61 via the bore 62 into the hydraulic chamber 55 as well as via the bore 58 in the piston stay 52 into the hydraulic chamber 56.

The annular channel 61, as schematically illustrated in FIGS. 6a through 6c, communicates with the reservoir 18 for the hydraulic medium which is arranged within the housing portion 12 or external thereto.

When the piston 6 is moved in the other direction, the hydraulic medium is moved in the disclosed manner, based on the central position according to FIG. 6a, from the hydraulic chamber 55 in the reverse direction. The disclosed function of the displacement of the hydraulic medium, of the damping action, and the pressure relief is identical but carried out in the reverse direction.

The bores 60, 62 must not have a circular cross-section but can also have any other suitable cross-section adapted to the respective requirements. Instead of the bores 60, 62 it is also possible to employ an annular channel.

The damping device 13, as is indicated in dash-dotted lines in FIG. 6 is arranged within the electric drive 1 in the receiving chamber 50. The damping piston 13 in this case is advantageously formed by a portion of the armature axle 5. The damping piston 13 can also be positioned within the electric drive 1 in the area of the pressure spring 9. In the disclosed embodiment, in contrast to the embodiment according to FIG. 5, it is hydraulic medium and not air that is to be displaced.

FIGS. 7 and 7a through 7c show a damping device which is embodied similarly to the embodiment of the previous example. The damping piston 13 is arranged in the receiving chamber 50 but can also be arranged in the housing extension 45 in which the pressure spring 9 is received. In the disclosed embodiment, the damping piston 13 is again a component of the armature axle 5. It supports three spaced-apart annular stays 51, 52, 65 whereby the two outer annular stays 51, 52 have the same width but are wider than the centrally arranged annular stay 65. FIG. 7a shows the central, respectively, initial position of the damping piston 13. The two outer annular stays 51, 52 delimit respectively a hydraulic chamber 53, 56 which on the opposite side is respectively delimited by a bearing 66, 67 for the armature axle 5. The two annular stays 51, 52 are provided each with a through bore 57, 58 via which the hydraulic chambers 53, 56 are connected to the hydraulic chambers 54, 55 which are provided between the outer annular stays 51, 52 and the central annular stay 65. The central annular stay 55 is positioned closely to the wall of the bore 20. The two hydraulic chambers 53, 56 are then respectively connected by at least one bore 60, 62 to the annular channel 61 which is connected to the reservoir 18 for the hydraulic medium.

In FIGS. 7a through 7c, according to the previous embodiment, three different positions are represented for the movement of the damping piston 13 from its central position according to FIG. 7a in a downward direction in order to move the valve stem 47 (FIG. 7) in the representation according to FIG. 7 in a downward direction. The respective coil 3 of the electric drive 1 is excited so that the armature 6 seated on the armature axle 5 is moved in the corresponding direction. Upon movement of the damping piston 13 in FIG. 7 in the downward direction, the hydraulic medium is displaced in the manner disclosed in connection with the previous embodiment via the bore 62 into the annular channel 61 and from there via the bore 60 into the hydraulic chamber 53. As soon as the stay 52 cooperates with the bore 62, the flow cross-section is steadily reduced so that hydraulic medium in the hydraulic chamber is subjected to increasing pressure. The stay 52 finally reaches a position in which the bore 62 is covered by it and thus closed. Accordingly, the hydraulic medium present within a very small hydraulic chamber 56 is pressurized. Via the bore 58 of the stay 52 the hydraulic medium present within the hydraulic chamber 55 between the two annular stays 52, 65 is at the same pressure that is present in the hydraulic chamber 56. In this position the braking action (damping action) of the damping piston 13 is completed.

As has been disclosed already in connection with a previous embodiment, the damping piston 13 can be moved from the position according to FIG. 7b farther into the position according to FIG. 7c in which the bore 62 is again opened by the other edge of the annular stay 52. The hydraulic medium can then be displaced from the hydraulic chamber 56 via the bore 58 in the annular stay 52, the hydraulic chamber 55, and the bore 62 into the annular channel 61. In this manner, the pressure of the hydraulic medium is relieved. In the position according to FIG. 7c, the annular stay 52 is positioned with minimal spacing to the end face 68 of the bearing bushing 67.

In other respects, this embodiment is of identical construction as the previous embodiment. The function is also the same as that of the embodiment according to FIG. 6.

FIGS. 8, 9, 9a and 9b show an embodiment in which the damping piston 13 is not a part of the armature axle 5 but is a separate element arranged on the armature axle. The armature 6 fastened to the armature axle 5 is not positioned in a hydraulic medium, but is surrounded by air. Accordingly, the armature 6 during its free float phase must only be placed against the air resistance and the differential force of the two springs 9, 49 loading the armature axle 5 and the valve stem 47, in order to provide the function of the damping device. The two damping pistons 13 are embodied as hollow pistons which are seated on the armature axle 5. The armature axle 5 is guided through the two bearings 69, 70 in which a respective seal 71, 72 is arranged for sealing the armature axle 5.

The end of the armature axle 5 remote from the valve stem 47 supports the spring plate 8 on which the pressure spring 9 is seated.

The two damping pistons 13 are positioned on opposite sides of the armature 6 and are of identical construction but are mirror-symmetrically arranged to one another.

Figure 8:
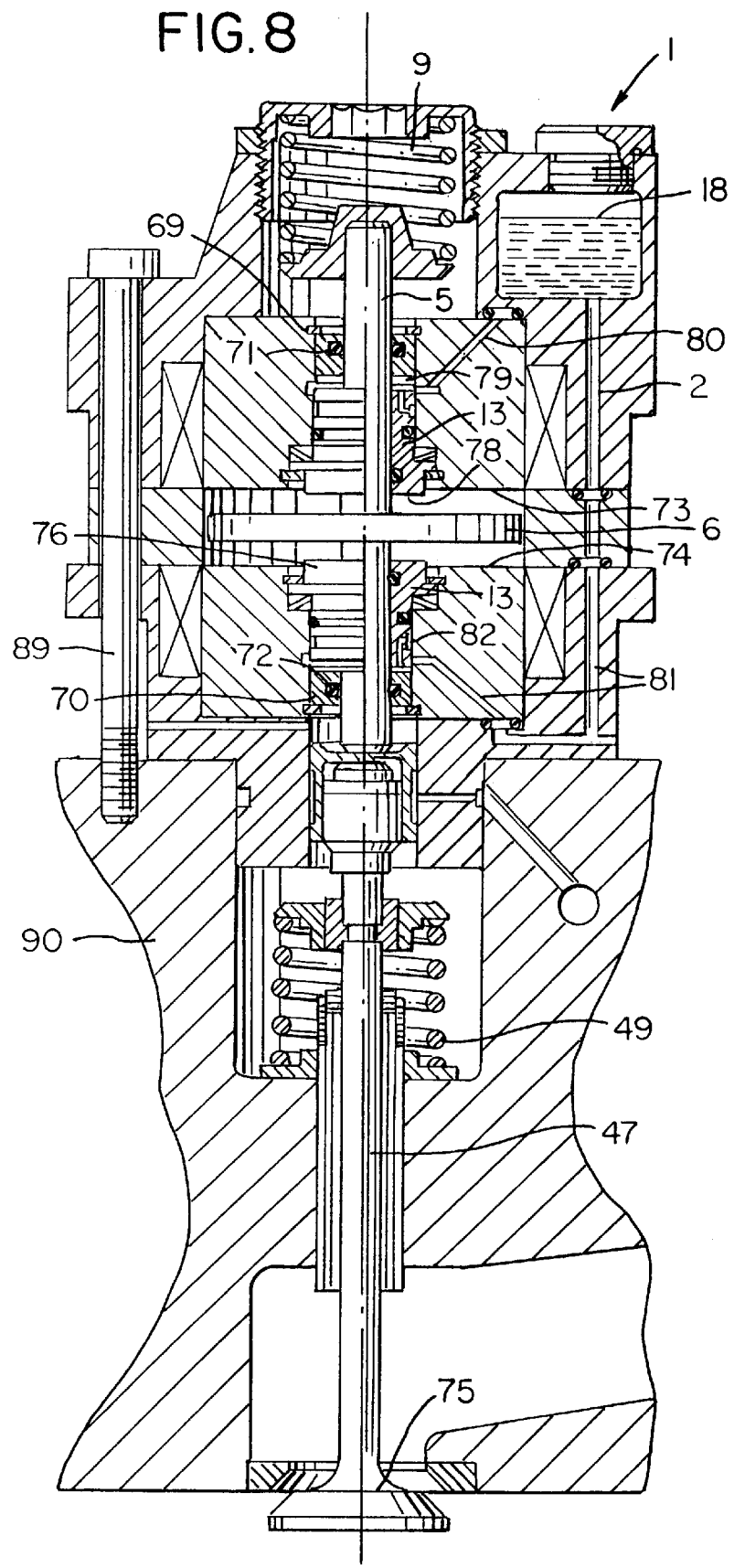
FIG. 8 shows an axial section of a further embodiment of the inventive damping device.

FIGS. 8 and 9 show the armature 6 in its central position in which it is positioned in the area between the two contact surfaces 73, 74 at the housing. When the valve 75 (FIG. 8) at the free end of the valve shaft 47 is closed, the valve stem 47 and thus the armature axle 5 are moved in the upper direction according to the representation of FIG. 8. The lower damping piston 13 is forced by the force of the return spring 14, preferably embodied as a plate spring (FIG. 9) at the securing ring 76 at the housing. The upper damping piston 13 is forced by the force of the return spring 14 against the securing ring 77 at the housing. The end face 78 facing the lower damping piston 13 projects past the abutment surface 73. This projection corresponds to the damping stroke DH and the relief stroke EH (FIG. 9) whose function will be disclosed in the following. When the valve 75 is closed and the valve stem 47 is moved accordingly upwardly, the armature axle 5 which is in operative connection with the valve stem 47, is entrained accordingly. The armature 6 moves across the free float spacing FF (FIG. 9) until it abuts the end face 78 of the upper damping piston 13. Upon further movement, the damping piston is thus entrained counter to the force of the pressure spring 14. The spacing of the damping piston 13 from the upper bearing 69 is greater than the total stroke GH (FIG. 9) of the armature. This ensures that the upper damping piston 13 in the abutment position of the armature 6 at this damping piston is still spaced from the bearing 69. Accordingly, between the bearing 69 and the damping piston 13 a closed hydraulic chamber 79 is formed. The housing 2 of the electric drive 1 comprises the reservoir 18 for the hydraulic medium that can be supplied by lines 80, 81 to the upper hydraulic chamber 79 (FIG. 9) as well as to the lower hydraulic chamber 82 (FIG. 9). The two hydraulic chambers 79, 82 are in communication with the annular channels 83, 84 at the housing. In the central position of the armature 6, the annular channels 83, 84 are connected with the corresponding hydraulic chamber 79, 82. When the upper damping piston is entrained by the armature 6 after completion of the free float stroke FF, the damping piston 13 will initially reduce and finally close the control cross-section embodied as the annular channel 83. The hydraulic medium contained in the hydraulic chamber 79 is accordingly pressurized with continuously increasing pressure until upon closure of the connection to the annular channel 83 the required braking pressure has been reached. This pressure generation takes place within the damping stroke DH of the damping piston 13. As in the previous embodiments, the damping piston 13 can perform, subsequent to the damping stroke DH, a relief stroke EH during which the pressure within the hydraulic pressure chamber 79 is relieved. During this relief stroke EH the annular channel 83 is again opened by the oppositely positioned edge 86 of the annular stay 93 of the damping piston 13. The hydraulic medium can thus flow from the hydraulic chamber 79 via the bore 85 into the annular channel 83 and from there via the line 80 into the reservoir 18. In this manner, the pressure of the hydraulic medium is relieved.

When the armature 6 contacts the abutment surface 73, the end face 87 of the damping piston 13 is spaced from the bearing bushing 69.

When the armature axle 5 is moved downwardly, the above described actions will be performed at the lower damping piston 13.

The reservoir 18, as disclosed in the previous embodiments, is not completely filled with hydraulic medium so that during the damping stroke DH and the relief stroke EH the displaced hydraulic medium can be received by the reservoir 18. The electric drive 1 itself has two coils 3 which are spaced from one another and positioned on opposite sides of the armature 6. The housing 2 of the electric drive 1 is comprised of three parts which are placed on top of one another and secured by screws 89 to the engine block 90 or another stationary part. Due to the multi-component embodiment of the housing 2, the different components can be simply mounted and, if needed, removed.

In order to realize a simple connection between the annular channels 83, 84 and the lines 80, 81 in the connecting area, a pocket 91 (FIG. 9a) is machined by a T-shaped milling tool 92. In a plan view the pocket 91 has a crescent shape.

During the disclosed outward movement of the upper damping piston 13 the volume of the hydraulic chamber 79 is continuously reduced. At the same time, the free controlled cross-section of the annular channel 83 is continuously reduced. The displacement of the hydraulic medium from the hydraulic chamber 79 into the annular channel 83 is throttled so that the damping action is achieved. The width of the stay 93 of the damping piston 13 closing the width of the annular channel 79 corresponds to the cross-sectional width of the annular channel 83. Accordingly, directly after closing of this control cross-section upon further movement of the damping piston 13 the control cross-section is again opened so that the hydraulic medium can be displaced in the aforedisclosed manner from the hydraulic chamber 79 via the bore 85 in the damping piston 13 into the annular chamber 83. Advantageously, the opening of the bore 85 at the piston mantle is designed as an annular groove so that, over the entire circumference of the damping piston 13, the hydraulic medium can be displaced during the relief stroke EH in the disclosed manner from the hydraulic chamber 79 into the annular chamber 83 at the housing.

When it is desired to move the armature axle 5 into a downward direction according to FIGS. 8 and 9, the lower coil 3 of the electric drive 1 is supplied with current. The upper damping piston 13 is moved in the downward direction by the force of the pressure spring 14. As soon as the upper damping piston 13 abuts the securing ring 77, the upper damping piston 13 remains in its represented position. The aforementioned movements are now performed by the lower damping piston 13 in the reverse direction.

The pressure spring 49 loading the valve stem 47 as well as the pressure spring 9 loading the armature axle 5 have the same spring characteristic line (FIG. 10). Accordingly, the central position of the armature 6, represented in FIGS. 8 and 9, is realized when the electric drive 1 is not actuated. The pressure springs 9, 49 can also have different c values, but must be of such a size that the central position of the armature 6 can be maintained in the rest position.

In FIG. 10, the spring characteristic lines of the two pressure springs 9, 49 and the resulting differential force are represented. The two spring characteristic lines extend in opposite direction relative to one another. When in the disclosed manner one of the two damping pistons 13 is moved, an additional force (damping stroke DH) corresponding to the pressure generation in the hydraulic chamber 79 or 82 is added to the differential force, as soon as the annular channel 83 or 84 is closed. The magnetic force of the solenoid 1 must be greater than the sum of the differential force and the added damping force. Due to the pressure of the inner bore of the damping piston 13 it is possible that the pressure can be quickly relieved by the relief stroke EH of the damping spring 13 as soon as upon further movement of the damping piston 13 the control cross-section of the annular channel 83, 84 is again opened. The total force at the stroke end of the damping piston 13 is thus again reduced to the differential force so that a change of the magnetic force is not required.

As a drive not only the aforementioned and disclosed electric drive 1 in the form of a solenoid can be used. It is also possible to use other drives which are operated pneumatically, electrically, mechanically, or piezoelectronically etc.

Figure 11:
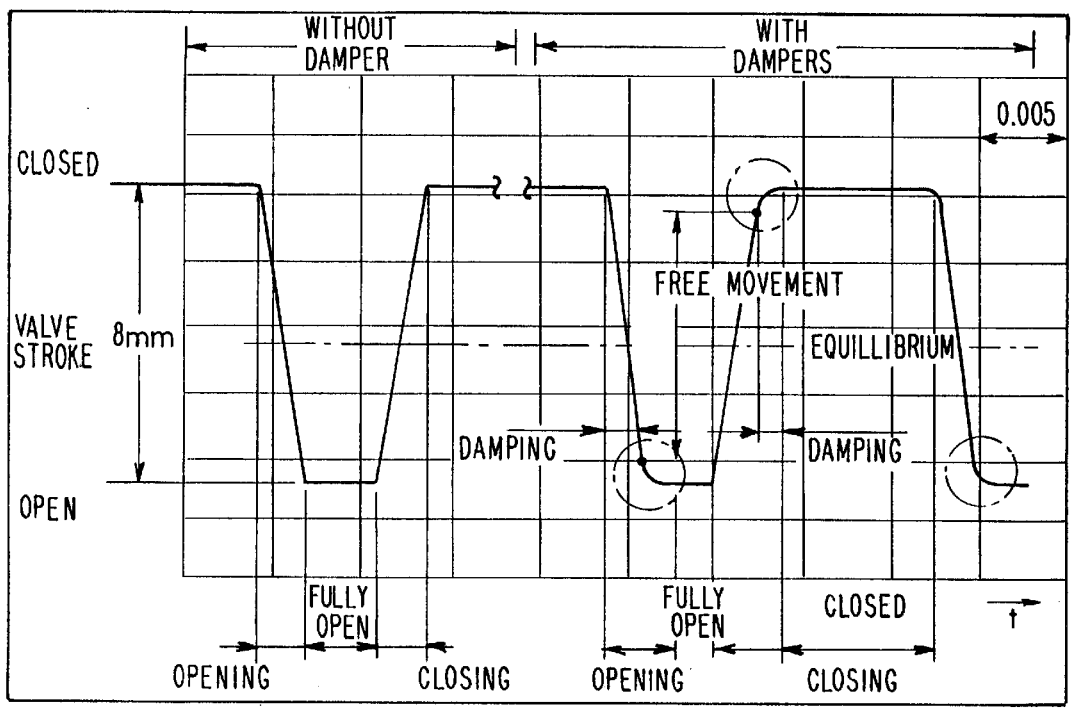
FIG. 11 shows a stroke/time diagram for drive systems with and without damping device.

FIG. 11 shows in an exemplary manner the effect of the damping device upon closing and opening a valve of an internal combustion engine of a vehicle. In the left half, the behavior without damping device, in the right half the behavior with use of the inventive damping device is represented. When the valves operate without damping device, abrupt movements occur during closing as well as during opening of the valve abrupt movements occur. When using the damping device, the transition to closing and opening of the valve are continuous, as represented in FIG. 11 by dash-dotted circles.

Figure 12:
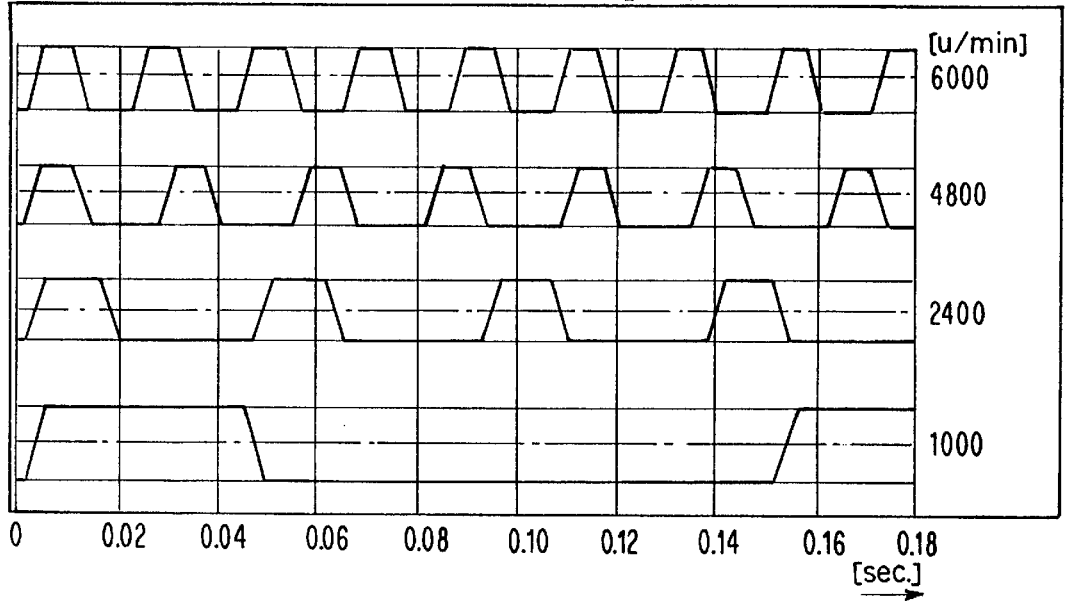
FIG. 12 shows in a diagram valve control cycles of valve controls of an internal combustion engine embodied with the inventive damping device at various rpm values.

FIG. 12 shows in an exemplary manner the valve control cycles for different rpm. Depending on the engine rpm, within a predetermined time a different number of damping actions is required which occur respectively within the same amount of time.

The specification incorporates by reference the disclosure of German priority document 198 34 522.4 of Jul. 31, 1998.

The present invention is, of course, in no way restricted to the specific disclosure of the specification and drawings, but also encompasses any modifications within the scope of the appended claims.

What is claimed is:

1. A damping device for an electromagnetic valve control of an internal combustion engine, said damping device comprising:

a pressure chamber (15, 54, 55, 79, 82);

a hydraulic supply line (25, 60, 62, 80, 81) communicating with said pressure chamber (15, 54, 55, 79, 82) and supplying said pressure chamber (15, 54, 55, 79, 82) with a hydraulic medium;

a first damping piston (13) positioned at one side of said pressure chamber (15, 54, 55, 79, 82) and movable relative to said pressure chamber (15, 54, 55, 79, 82);

a moveable mass (5, 6, 47, 75, 37, 42) acting on said first damping piston (13);

wherein, when said first damping piston (13) is moved in a first direction by said moveable mass (5, 6, 47, 75, 37, 42) from a rest position into said pressure chamber (15, 54, 55, 79, 82), the hydraulic medium is initially displaced from said pressure chamber (15, 54, 55, 79, 82) into said hydraulic supply line (25, 60, 62, 80, 81) until said hydraulic supply line (25, 60, 62, 80, 81) is closed off by said first damping piston (13) and a hydraulic pressure is generated in first pressure chamber (15, 54, 55, 79, 82) to create a force acting counter to a movement of said moveable mass (5, 6, 47, 75, 37, 42).

2. A damping device according to claim 1, wherein said moveable mass (5, 6, 47, 75, 37, 42) has a rest position in which said moveable mass (5, 6, 47, 75, 37, 42) is spaced from said first damping piston (13).

3. A damping device according to claim 1, wherein said first damping piston (13) has an end face (22) bordering said pressure chamber (15, 54, 55, 79, 82), wherein said end face (22) has a depression (23) providing communication between said hydraulic supply line (25) and said pressure chamber (15, 54, 55, 79, 82) in said rest position of said first damping element (13).

4. A damping device according to claim 3, wherein said depression (23) has a cross-section widening in a direction toward said pressure chamber (15, 54, 55, 79, 82).

5. A damping device according to claim 3, wherein said first damping piston (13) has at least one control cross-section portion (30) positioned perpendicularly to central axis of said first damping piston (13) and at a spacing to said end face (22).

6. A damping device according to claim 5, wherein said control cross-section portion (30) is connected to said hydraulic supply line (25) when said first damping piston (13) is moved past a closing position in which said hydraulic supply line (25, 60, 62, 80, 81) is closed off.

7. A damping device according to claim 5, wherein said hydraulic supply line (25) has at least one throttle (32).

8. A damping device according to claim 7, comprising a receiving chamber (20) in which said first damping piston (13) is guided, wherein said throttle (32) is an annular gap between said first damping piston (13) and a wall of said receiving chamber (20).

9. A damping device according to claim 3, wherein said first damping piston (13) has a bore (85) having an opening at said end face (22) and having an opening at a mantle surface of said first damping piston (13).

10. A damping device according to claim 1, comprising a reservoir (18) for the hydraulic medium, wherein said first hydraulic supply line (25, 60, 62, 80, 81) is connected to said reservoir (18).

11. A damping device according to claim 1, further comprising a second damping piston (13) positioned at an end of said moveable mass (37, 42, 5, 6, 47, 75) remote from said first damping piston (13).

12. A damping device according to claim 11, wherein said first and second damping pistons (13) are mirror-symmetrically arranged relative to one another.

13. A damping device according to claim 1, further comprising a spring (14) acting on said first damping piston (13) in a direction counter to said first direction.

14. A damping device according to claim 13, wherein said moveable mass (5, 6, 47, 75) engages said first damping piston (13) after overcoming a free float spacing (27, FF) and entrains said first damping piston (13) against said spring (14) and against said hydraulic pressure in said pressure chamber so that said first damping piston (13) performs a damping stroke (DH).

15. A damping device according to claim 14, wherein said moveable mass (5, 6, 47, 75) entrains said first damping piston (13) farther after completion of said damping stroke (DH) so that said first damping piston (13) performs a relief stroke (EH) to release said hydraulic pressure in said pressure chamber (15, 79, 82).

16. A damping device according to claim 1, wherein said damping piston (13) has a first annular stay and a second annular stay (51, 52), wherein each one of said annular stays (51, 52) separates two hydraulic chambers (53–56) from one another.

17. A damping device according to claim 16, wherein each one of said first and second annular stays (51, 52) has at least one opening (57, 58) connecting said two hydraulic chambers (53, 54, 55, 56) separated by said annular stay (51, 52).

18. A damping device according to claim 16, wherein said damping piston (13) further comprises a third annular stay (65) positioned between said first and second annular stays (51, 52) and separating two neighboring ones of said hydraulic chambers (54, 55) from one another.

19. A damping device according to claim 1, wherein said damping piston (13) is a part of an armature axle (5) of an electric drive (1).

20. A damping device according to claim 1, wherein said damping piston (13) is slidably mounted on an armature axle (5) of an electric drive (1).

* * * * *